(12) United States Patent
Proulx et al.

(10) Patent No.: US 9,744,909 B2
(45) Date of Patent: Aug. 29, 2017

(54) PROPANE TANK SUPPORT APPARATUS EQUIPPED WITH TRUNK OPENING DEVICE

(71) Applicants: Guy Proulx, Vercheres (CA); Louis Caron, Boucherville (CA)

(72) Inventors: Guy Proulx, Vercheres (CA); Louis Caron, Boucherville (CA)

(*) Notice: Subject to any disclaimer, the term of this patent is extended or adjusted under 35 U.S.C. 154(b) by 0 days.

(21) Appl. No.: 15/411,973

(22) Filed: Jan. 21, 2017

(65) Prior Publication Data

US 2017/0217377 A1 Aug. 3, 2017

(30) Foreign Application Priority Data

Feb. 2, 2016 (GB) .................................. 1601882.2

(51) Int. Cl.
| | | |
|---|---|---|
| *B60P 7/08* | (2006.01) | |
| *B60R 7/08* | (2006.01) | |
| *E05C 17/04* | (2006.01) | |
| *E05C 17/12* | (2006.01) | |
| *B60R 7/02* | (2006.01) | |

(52) U.S. Cl.
CPC ........ *B60R 7/08* (2013.01); *B60P 7/08* (2013.01); *B60R 7/02* (2013.01); *E05C 17/047* (2013.01); *E05C 17/12* (2013.01)

(58) Field of Classification Search
CPC ........... E05C 17/047; E05C 7/08; B60R 7/08; B60R 7/02; B60P 7/08

USPC ............ 410/35, 36, 42, 46, 47, 49, 50, 155; D23/206; 206/446; 211/85.18, 85.22
See application file for complete search history.

(56) References Cited

U.S. PATENT DOCUMENTS

| | | |
|---|---|---|
| 4,907,712 A | 3/1990 | Stempin |
| 4,932,621 A | 6/1990 | Kowk |
| D331,792 S | 12/1992 | Wilcox |
| D367,960 S | 3/1996 | Werbesky, Jr. |
| D385,615 S | 10/1997 | St-Louis |
| 5,813,643 A | 9/1998 | Zybert |
| 6,065,915 A * | 5/2000 | Ruehl ........................ B60P 7/12 410/100 |
| 6,302,291 B1 | 10/2001 | McCleerey |
| 7,131,618 B2 | 11/2006 | Berry et al. |
| 7,244,084 B2 * | 7/2007 | Anthony .................... B60P 7/12 410/36 |
| D564,619 S | 3/2008 | Cogswell, Jr. et al. |
| 7,644,819 B2 | 1/2010 | Gill et al. |
| D658,267 S | 4/2012 | Brockington et al. |
| 8,915,682 B2 * | 12/2014 | Mulanon ............... F17C 13/084 410/50 |
| 2010/0276435 A1 | 11/2010 | Fredette |

* cited by examiner

*Primary Examiner* — Stephen Gordon

(57) ABSTRACT

A propane trunk support apparatus for a car trunk comprising: a base including a pair of pegs; a cylindrical receptacle portion having an outer surface, an inner surface, and an opening configured and sized to receive a propane tank, wherein the opening has an outer circumference and an inner circumference; and a trunk opening device removably attached to the pair of pegs, wherein the trunk opening device is configured to position a car trunk lid in a partially open position.

7 Claims, 2 Drawing Sheets

PROPANE TANK SUPPORT APPARATUS EQUIPPED WITH TRUNK OPENING DEVICE

CROSS-REFERENCE TO RELATED APPLICATIONS

The present application claims priority to United Kingdom Patent Application serial number UK1601882.2, filed on Feb. 2, 2016 entitled "A propane tank holder equipped with a device to hold the lid of a semi-open car trunk", the disclosure of which is hereby incorporated in its entirety at least by reference.

BACKGROUND OF THE INVENTION

1. Field of the Invention

The present invention relates generally to holding devices but more particularly to a propane tank support apparatus equipped with trunk opening device 2. Description of Related Art Propane tanks are used mostly in conjunction with barbeque (BBQ) grills and are often carried in the trunk of a car when returning an old one, exchanging, or getting a new one. Propane tanks are also used when going camping and other similar activities where carrying a propane tank in a car trunk or pickup truck bed is required. Their shape and configuration makes them easy to tip over and roll when a vehicle is moving. Also, regulations require for air circulation should the tank have a leak, therefore, it is recommended that the lid of a car trunk be left partially open. Consequently, there is a need for a simple and practical way of carrying a propane tank in a vehicle.

BRIEF SUMMARY OF THE INVENTION

In one embodiment of the present invention a propane trunk support apparatus for a car trunk is provided, comprising: a base including a pair of pegs; a cylindrical receptacle portion having an outer surface, an inner surface, and an opening configured and sized to receive a propane tank, wherein the opening has an outer circumference and an inner circumference; and a trunk opening device removably attached to the pair of pegs, wherein the trunk opening device is configured to position a car trunk lid in a partially open position.

In one embodiment, the base is comprised of a sustainably square shape having a perimeter with rounded corners. In another embodiment, a plurality of support webbings is provided, wherein the support webbings are positioned from the perimeter of the base to the outer surface of the cylindrical receptacle portion and extending to the outer circumference of the opening. In one embodiment, a resiliently deformable holding ring is provided on the inner circumference of the opening, wherein the holding ring includes a plurality of tabs configured to provide a firm grasp of the propane tank.

In one embodiment, a plurality of tapered fittings located opposite to the plurality of support webbings on the inner surface of the cylindrical receptacle portion is provided, wherein the plurality of tapered fittings provide a frictional hold onto the propane tank. In another embodiment, the plurality of tapered fittings extends the entire length of the cylindrical receptacle portion. In yet another embodiment, the plurality of support webbings is four, and the support webbings are aligned with the rounded corners.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a propane tank support apparatus equipped with trunk opening device.

Figure 1:
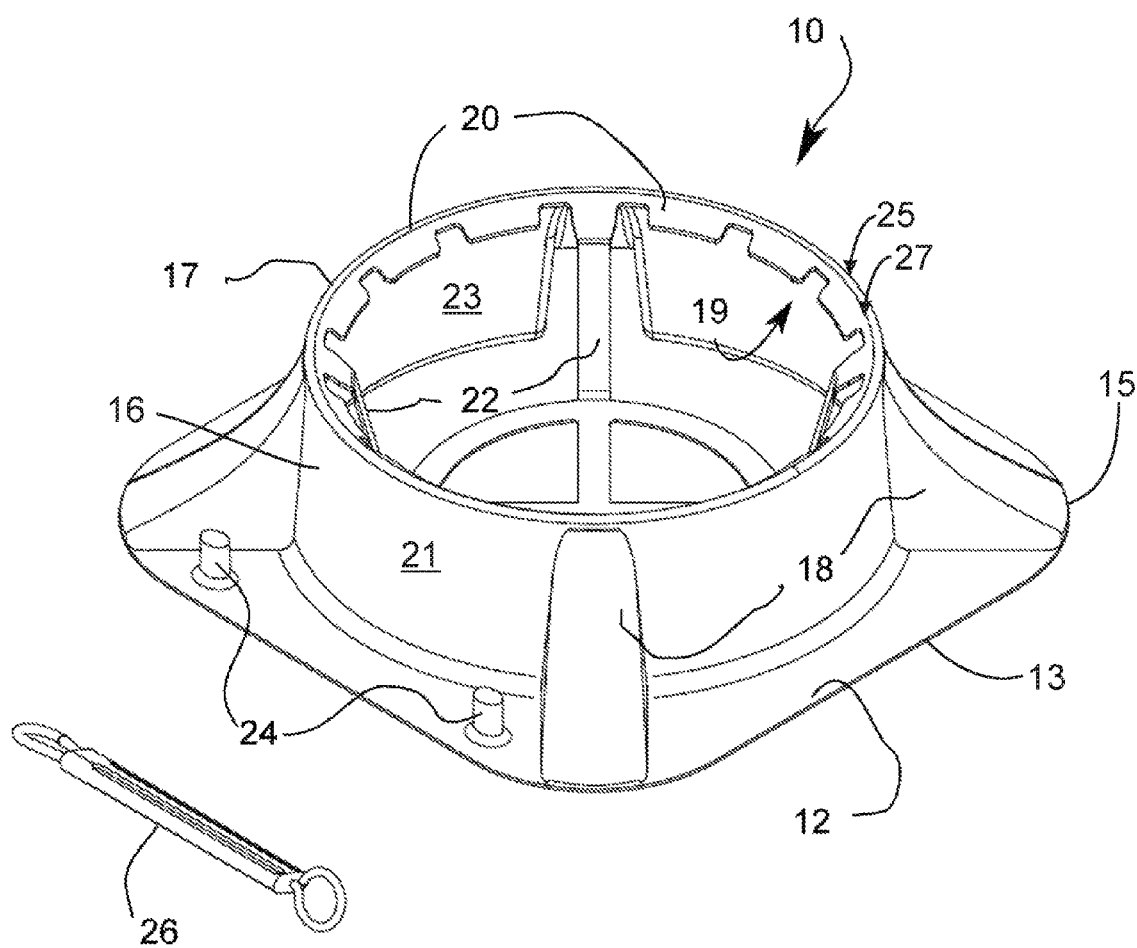
FIG. 1 illustrates an isometric view of a propane tank support apparatus equipped with trunk opening device in accordance with an embodiment of the present invention.
Figure 2A:
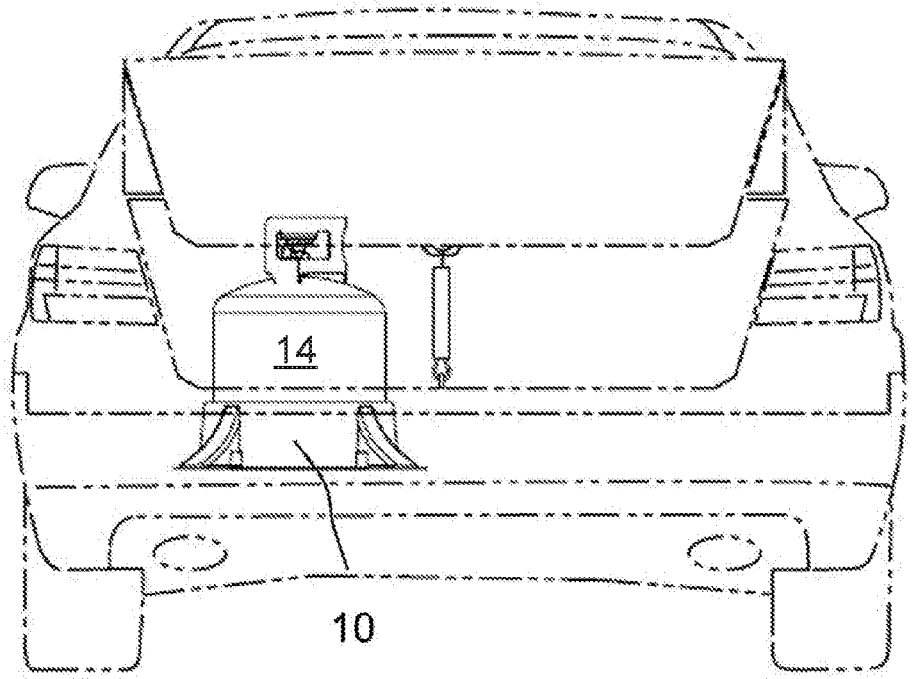
FIGS. 2A-B illustrate rear elevation views of the propane tank support apparatus equipped with trunk opening device in use accordance with an embodiment of present invention.

FIG. 1 illustrates an isometric view of a propane tank support apparatus 10 equipped with trunk opening device 26 in accordance with an embodiment of the present invention. Referring now to FIG. 1, the propane tank support apparatus comprises a square base 12 having a perimeter 13 with rounded corners 15 providing no sharp edges for ease of transport and safety. The apparatus further comprises a cylindrical receptacle portion 16 having an outer surface 21, inner surface 23, and an opening 17 configured and sized to receive a propane tank 14 (FIG. 2A). In one embodiment, the opening has an outer circumference 25 and inner circumference 27. The apparatus further comprises a plurality of webbings 18 positioned from the perimeter of the base to the outer surface of the cylindrical receptacle portion and extending to the outer circumference of the opening. The plurality of webbings provide support to the cylindrical receptacle portion, while strengthen the connection between the base and the cylindrical receptacle portion.

Still referring to FIG. 1, in one embodiment a resiliently deformable holding ring 19 is provided on the inner circumference of the opening. The holding ring includes a plurality of tabs 20 configured to provide a firm grasp around the circumference of the propane tank. In one embodiment, a plurality of tapered fittings 22 located opposite to the plurality of webbings on the inner surface of the cylindrical receptacle portion provide an additional frictional hold onto the propane tank when stored. The plurality of tapered fittings extends the entire length of the cylindrical receptacle portion. In the preferred embodiment, the plurality of webbings is four, and webbings are aligned with the rounded corners.

Figure 2B:
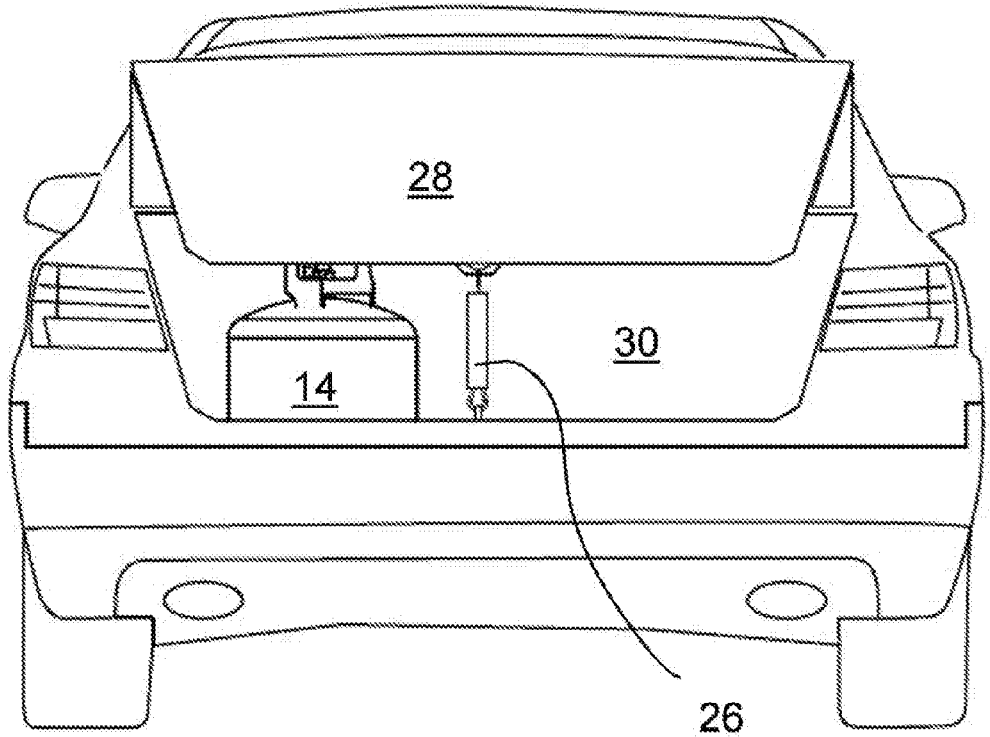

Now referring to FIG. 1 and FIGS. 2A-B, in one embodiment, the base comprises a pair of pegs 24 configured to releasably attach a trunk opening device 26 during storage. During use, the trunk opening device may be removed from the pegs and positioned to hold a car trunk lid 28 in a partially open position, allowing air circulation in the event that the propane tank has a leak in a car trunk 30. If the car trunk lid is closed during a leak, the propane gas can enter the cabin of the car. Since, propane gas is odorless, a person would not be aware, and in some situations may lead to dangerous conditions, including fire or asphyxiation.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A propane trunk support apparatus for a car trunk comprising:
   a base including a pair of pegs;
   a cylindrical receptacle portion having an outer surface, an inner surface, and an opening configured and sized to receive a propane tank, wherein the opening has an outer circumference and an inner circumference; and
   a trunk opening device removably attached to the pair of pegs, wherein the trunk opening device is configured to position a car trunk lid in a partially open position.

2. The propane trunk support apparatus of claim 1, wherein the base is comprised of a substantially square shape having a perimeter with rounded corners.

3. The propane trunk support apparatus of claim 2, further comprising a plurality of support webbings positioned from the perimeter of the base to the outer surface of the cylindrical receptacle portion and extending to the outer circumference of the opening.

4. The propane trunk support apparatus of claim 1, further comprising a resiliently deformable holding ring on the inner circumference of the opening, wherein the holding ring includes a plurality of tabs configured to provide a firm grasp of the propane tank.

5. The propane trunk support apparatus of claim 3, further comprising a plurality of tapered fittings located opposite to the plurality of support webbings on the inner surface of the cylindrical receptacle portion, wherein the plurality of tapered fittings provide a frictional hold onto the propane tank.

6. The propane trunk support apparatus of claim 5, wherein the plurality of tapered fittings extend an entire length of the cylindrical receptacle portion.

7. The propane trunk support apparatus of claim 3, wherein the plurality of support webbings is four webbings, and the support webbings are aligned with the rounded corners.

* * * * *